US005797530A

United States Patent [19]

Unuma et al.

[11] Patent Number: 5,797,530

[45] Date of Patent: Aug. 25, 1998

[54] SHEET FEED TRACTOR

[75] Inventors: Sadao Unuma; Tohru Hamamoto, both of Ohbu, Japan

[73] Assignee: Tokai Kogyo Kabushiki Kaisha, Ohbu, Japan

[21] Appl. No.: 789,546

[22] Filed: Jan. 27, 1997

[51] Int. Cl.[6] .......... G03B 1/30

[52] U.S. Cl. .......... 226/74

[58] Field of Search .......... 226/74, 75

[56] References Cited

U.S. PATENT DOCUMENTS

| | | | |
|---|---|---|---|
| 3,938,721 | 2/1976 | Staneck et al. | 226/75 |
| 4,826,337 | 5/1989 | Unuma | 226/74 X |
| 4,915,280 | 4/1990 | Howes et al. | 226/74 |
| 5,048,739 | 9/1991 | Unuma et al. | 226/74 |
| 5,188,269 | 2/1993 | Nakano | 226/74 |

*Primary Examiner*—Michael Mansen
*Attorney, Agent, or Firm*—Oblon, Spivak, McClelland, Maier & Neustadt, P.C.

[57] ABSTRACT

A second frame 12 is arranged at a predetermined position with respect to a drive sprocket 15 engaged with a drive shaft DS through a substantially true-circular hole shape drive bearing bore 14, and a transferring belt 25 is supported by a belt guide 18 integrally incorporated with the second frame 12 under a suitable tension while a predetermined positional relationship is maintained between the transferring belt 25 and the drive sprocket 15. If the inter shaft distance T between the drive shaft DS and a positioning shaft SS varies due to any reason, the variation in the inter shaft distance T between both shafts DS, SS is allowed by clearances of an elongated hole shape positioning bearing bore 20 formed in the second frame 12 and an elongated hole shape drive bearing bore 13 formed in a first frame 11, and accordingly, the transferring belt 25 is maintained always under a satisfactory predetermined tension with no variation in the tension of the transferring belt 25, thereby it is possible to enhance the accuracy of paper feed operation and printing operation and to enhance the reliability of the sheet feed tractor with a convenient structure.

14 Claims, 8 Drawing Sheets

SHEET FEED TRACTOR

BACKGROUND OF THE INVENTION

Field of the Invention

The present invention relates to a sheet feed tractor for transferring paper to be fed toward an established direction by applying a predetermined transferring force to the paper.

FIELD OF THE INVENTION

Related Art

Upon recording characters or patterns with the use of a printer incorporated with a computer, a word processor, a plotter or the like, continuous paper S, for example, as shown in FIG. 11 of the accompanying drawings is frequently used as recording paper. Several feed holes S1, S1, . . . are formed in rows at predetermined pitches in the paper feeding direction in opposite side edge parts of the continuous paper S. Further, sheet feed tractors 1 which engage with the above-mentioned feed holes S1 so as to apply a transferring force to the continuous paper S is used as a device for feeding such continuous paper S.

The above-mentioned sheet feed tractors 1 are normally arranged at opposite side edges of the continuous paper S, respectively, and transferring belts 2 provided in the sheet feed tractors 1 are formed thereon with several feed pins 3 adapted to be engaged in the feed holes S1, arranged in rows and projected therefrom. The transferring belts 2 are wound around sprockets which are not shown, so as to be engaged therewith, and when the transferring is carried out by the transferring belts 2 through the rotation of the drive sprockets, feed pins 3 which are present in the linearly extended part of the transferring belt 2 are engaged in the feed holes S1 so that a paper transferring force is transmitted to the continuous paper S.

At this time, the above-mentioned drive sprockets are rotatably mounted each being held between a pair of frames 5, 5, and accordingly, a rotating drive force is exerted thereto from a drive shaft DS extended through the sprockets. Further, as shown in FIG. 12, drive meshing teeth 6a, 6a . . . are formed on the outer peripheral surfaces of the sprockets 6, and the transferring belt 2 are mounted, being engaged with the drive meshing teeth 6a, 6a . . . .

Further, each of the frames 5 is integrally incorporated with a belt guide 7 which is formed of a plate member arranged adjacent to the above-mentioned sprocket 6 associated therewith, and accordingly, the transferring belt 2 is supported at its inner surface in parts where it does not engage with the sprocket by the belt guide 7, so as to be slidable.

Referring again FIG. 11, the above-mentioned sheet feed tractors 1 are fixed at positions by a predetermined distance from the above-mentioned drive shaft DS in parallel with the latter by means of a positioning shaft SS. That is, both frames 5, 5 are fitted onto the drive shaft DS and the positioning shaft SS, and the sheet feed tractors 1 are axially moved in its entirety up to a predetermined position, and then knobs 8a in lock mechanisms (locker) 8, thereby the sheet feed tractors 1 are secured to the positioning shaft SS.

It is noted that the above-mentioned sheet feed tractors 1 are each provided with paper retaining plates 9 which can be therefore opened and closed. These paper retaining plates 9 are each urged by spring means which is not shown, in its closing direction, and as to the sheet feed tractor 1 which is shown on the front side in FIG. 11, the continuous paper S is pressed against the transferring belts 2 by a pressing force of the paper retaining plate 9 which is obtained when the paper retaining plate 9 is closed, and accordingly, the above-mentioned feed pins 3 can be prevented from coming off from the feed holes S1 of the continuous paper S so that the paper feed can be normally maintained. Such feed operation is carried out by changing over both forward and backward directions in view of the function of the printer and a kind of printing.

Meanwhile, the inter shaft distance T between the drive shaft DS and the positioning shaft SS differs among devices due to manufacturing accuracy, expansion and contraction of the frames caused by temperature and humidity variation, difference in set values due to different types, bending or deformation of the shafts or the like, and accordingly, there have been conventionally proposed structures for absorbing variations in the inter shaft distance T. For example, in a device as shown in FIG. 13, a pair of drive side bearing bores 5a, 5a formed in both frames 5, 5 so as to rotatably support the drive sprockets 6, are extended therethrough in an elongated hole shape, and variation in the inter shaft distance T between both shafts DS, SS can be tolerated by the clearance of the elongated hole shape.

However, the above-mentioned conventional sheet feed tractor inevitably cause the tension of the transferring belt 2 from varying, being accompanied with the movement of the drive sprocket 6, resulting in such a problem of variation in torque for rotating the drive sprockets.

In order to eliminate the above-mentioned problem, there has been proposed a paper transferring device wherein the above-mentioned lock mechanism (locker) for locking and positioning which is supported to the frames so as to be floatable in order to be axially movable is moved so as to absorb variation in the inter shaft distance T between the drive shaft DS and the positioning shaft SS, and further, the transferring belt is supported so as to be slidable on the frame side, thereby it is possible to avoid variation in the tension of the transferring belt. However, even with this arrangement, the floatable supporting structure for the lock mechanism (locker) complicates the device structure, and accordingly, there has been caused such a problem that the productivity becomes lower.

SUMMARY OF THE INVENTION

Accordingly, one object of the present invention is to provide a sheet feed tractor having a convenient structure which can absorb variation in the inter shaft distance without causing variation in tension of the transferring belt, and which can satisfactorily carry out the paper feed.

To the end, according to the present invention, there is provided a sheet feed tractor comprising a pair of first and second frames which are arranged in a face-to-face relationship and in substantial parallel with each other; a drive sprocket rotatably held by the pair of first and second frames, a pair of drive bearing bores formed respectively in the first and second frames, extending therethrough, at positions where they face to each other, for rotatably journalling the drive sprocket, a looped transferring belt wound around the first and second frames, spanning the space therebetween so to be meshed with the drive sprocket, a belt guide for slidably supporting the inner surface side of the transferring belt, a drive shaft extending through the pair of drive side bearing bores, for transmitting a rotating drive force to the drive sprocket, a pair of positioning bearing bores formed respectively in the first and second frames, being spaced from the pair of drive bearing bores by a predetermined distance and extending therethrough at positions where they face to each other, and a positioning shaft extending through the positioning bearing bores in substantially parallel with the drive shaft, being spaced by a predetermined distance from the drive shaft, wherein the first and second frames are fitted on both shafts so as to be displaceable in a direction of connection of both shafts, and the drive bearing bore formed in the second frame is formed therethrough in a substantially true-circular shape so as to hold the drive sprocket to the second frame with no positional deviation, and the positioning bearing bores formed in the second frame and the drive bearing bore formed in the first frame are elongated throughout their respective frames so as to allow variation in the inter shaft distance between both shafts, and the belt guide is integrally formed with the second frame.

With this arrangement according to the invention, the second frame is at first located at a predetermined position with respect to the drive sprocket which is engaged on the drive shaft through the substantially true-circular shape drive bearing bore, and the transferring belt is supported by the belt guide formed integrally with the second frame so as to obtain a predetermined tension while maintaining a predetermined positional relationship with the drive sprocket. Further, in the case of variation of the inter shaft distance between the drive shaft and the positioning shaft due to any cause, variation in the inter shaft distance between both shafts is allowed through clearances exhibited by the elongated hole-shape positioning bearing bore formed in the second frame and the elongated hole-shape drive bearing bore formed in the first frame. Meanwhile, the transferring belt in this case is supported by the belt guide integrally incorporated with the second frame while maintaining a predetermined positional relationship with the drive sprocket, and accordingly, the tension of the transferring belt can be satisfactorily maintained always constant since no variation in the tension of the transferring belt is caused.

Further, according to the present invention stated in the 1, the positioning bearing bore formed in the first frame has a substantially true-circular shape so as to hold the positioning shaft with no positional deviation.

Since the positioning bearing bore formed in the first frame has a substantially fivecircular shape extending through the first frame so that the positioning shaft can be held to the first frame with no positional deviation, the first frame is surely maintained in a predetermined positional relationship with the positioning shaft. In this case, the first frame and the second frame cause a positional deviation, relative to each other in a direction of connection between both shafts in association with variation in the above-mentioned inter shaft distance.

Further, according to the present invention 1, the positioning bearing bore formed in the first frame is elongated extending through the first frame so as to allow variation in the inter shaft distance between the positioning shaft and the drive shaft.

Variation in the inter shaft distance between the drive shaft and the positioning shaft can be allowed due to clearances of the elongated drive and positioning bearing bores formed in the first frame and the elongated positioning bearing bore formed in the second frame.

Meanwhile, according to the present invention, there is provided a sheet feed tractor comprising a pair of first frame and a second frame arranged in a face-to-face relationship and in substantial parallel with each other, a drive sprocket rotatably held by the pair of first frame and second frame, a pair of drive bearing bores formed in the first and second frames, extending therethrough, at positions facing each other, for rotatably journalling the drive sprocket, a looped transferring belt wound around the first and second frames, spanning a gap therebetween, being meshed with the drive sprocket, a belt guide arranged so as to slidably support the inner surface side of the transferring belt, a drive shaft fitted in the pair of drive bearing bores extending therethrough, for transmitting a rotating force to the drive sprocket, a pair of positioning bearing bores formed in the first and second frames, extending therethrough, and located at positions facing each other and spaced from the pair of drive bearing bores by a predetermined distance, a positioning shaft extending through the pair of positioning bearing bores and arranged in substantial parallel with the drive shaft, being spaced from the latter by a predetermined distance, wherein the first and second frames are fitted on both shafts so as to be displaceable in the direction of connection between both shafts, the drive bearing bores formed in the first and second frames have a substantially true circular shape extending therethrough so as to hold the drive sprocket to the first and second frames with no positional deviation, the positioning bearing bores formed in the first and second frames has an elongated hole shape extending therethrough so as to allow variation in the inter shaft distance between both shafts, and the belt guide is integrally incorporated with at least one of the first and second frames.

The first and second frames are at first located at predetermined positions to the drive sprocket equipped with the drive shaft through the substantially circular shape drive bearing bores, and the transferring belt is supported under a predetermined tension while maintaining a predetermined positional relationship with the drive sprocket by the belt guide integrally incorporated with at least one of the first and second frames. If the inter shaft distance between the drive shaft and the positioning shaft varies due to any reason, this variation is allowed through the clearances of the elongated-hole shape positioning bearing bores formed in the first and second frames. Meanwhile, since the transferring belt in this case is supported by the belt guide which is integrally incorporated with at least one of the first and second frames while maintaining a predetermined positional relationship with the drive sprocket, it can be satisfactorily maintained always at a predetermined constant value with no variation in the tension of the transferring belt.

Further, according to the present invention, the first and second frames are fitted on the drive shaft and the positioning shaft so as to be displaceable in the direction of connection of both shafts.

Variation in the inter shaft distance between the drive shaft and the positioning shaft is allowed through a positional deviation between the first and second frames.

As mentioned above, in the sheet feed tractor according to the present invention, the frames are located at predetermined positions with respect to the drive sprocket engaged with the drive shaft, through the substantially true circular shape drive bearing bores, and the transferring belt is supported under a suitable tension by the belt guide integrally incorporated with the frame while maintaining a predetermined positional relationship with the drive sprocket, wherein in the case of variation in the inter shaft distance between the drive shaft and the positioning shaft due to any reason, the variation in the inter shaft distance is allowed by clearances of the elongated hole shape bearing bores formed in the frames so that the transferring belt can be maintained always under a predetermined satisfactory tension with no variation in the tension of the transferring belt, thereby it is possible to absorb variation in the inter shaft distance without causing variation in the tension of the transferring belt even through the structure thereof is convenient. Thus, according to the present invention, it is possible to easily effect satisfactory paper feed operation, and further, it is possible to enhance the productivity of sheet feed tractors with a high degree of reliability.

BRIEF DESCRIPTION OF THE INVENTION

DESCRIPTION OF THE PREFERRED EMBODIMENTS

The explanation will be made of an embodiment of the present invention with reference to the drawings.

Figure 1:
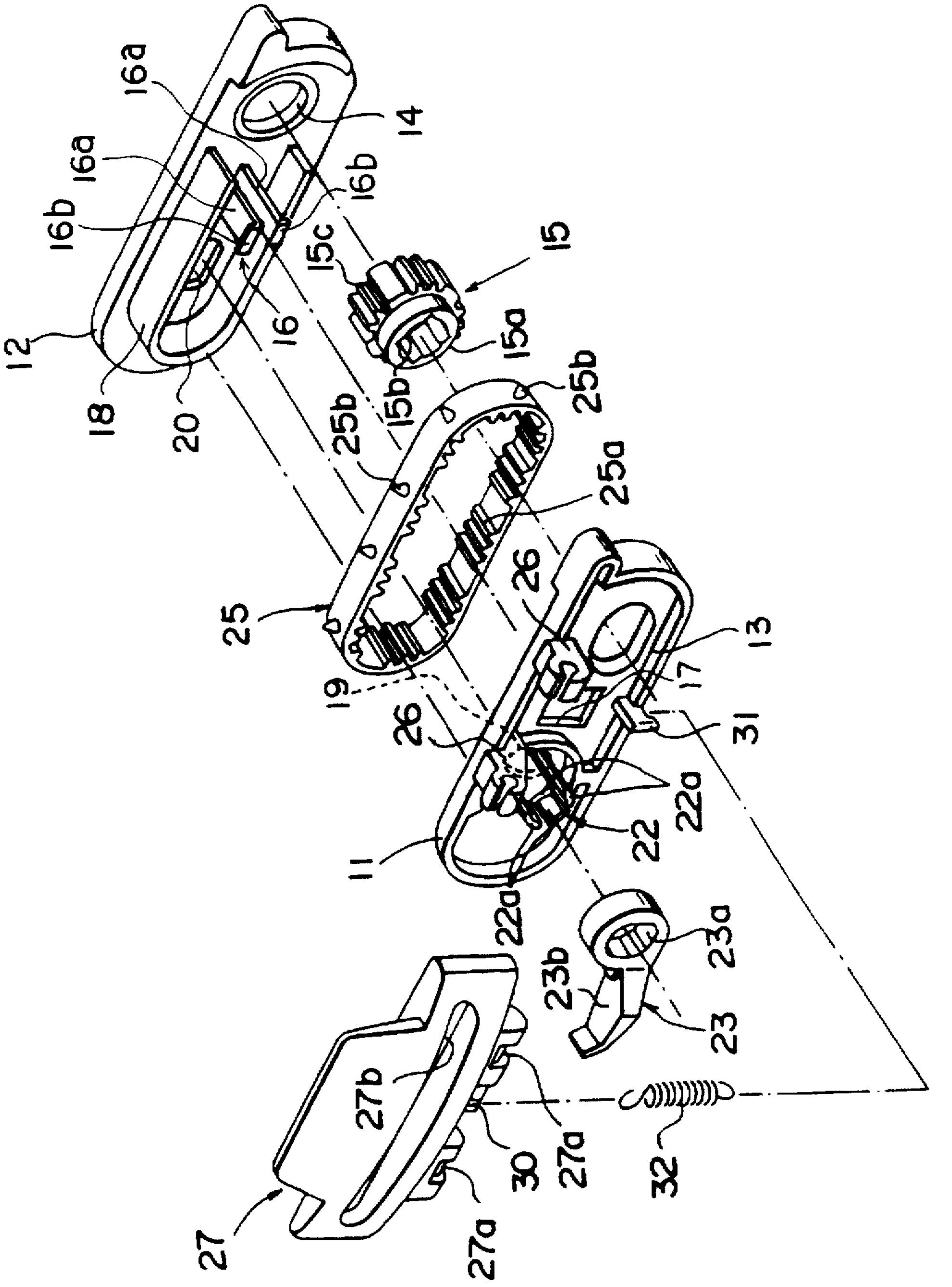
FIG. 1 is an explanatory perspective view illustrating a sheet feed tractor in an embodiment of the present invention.
Figure 2:
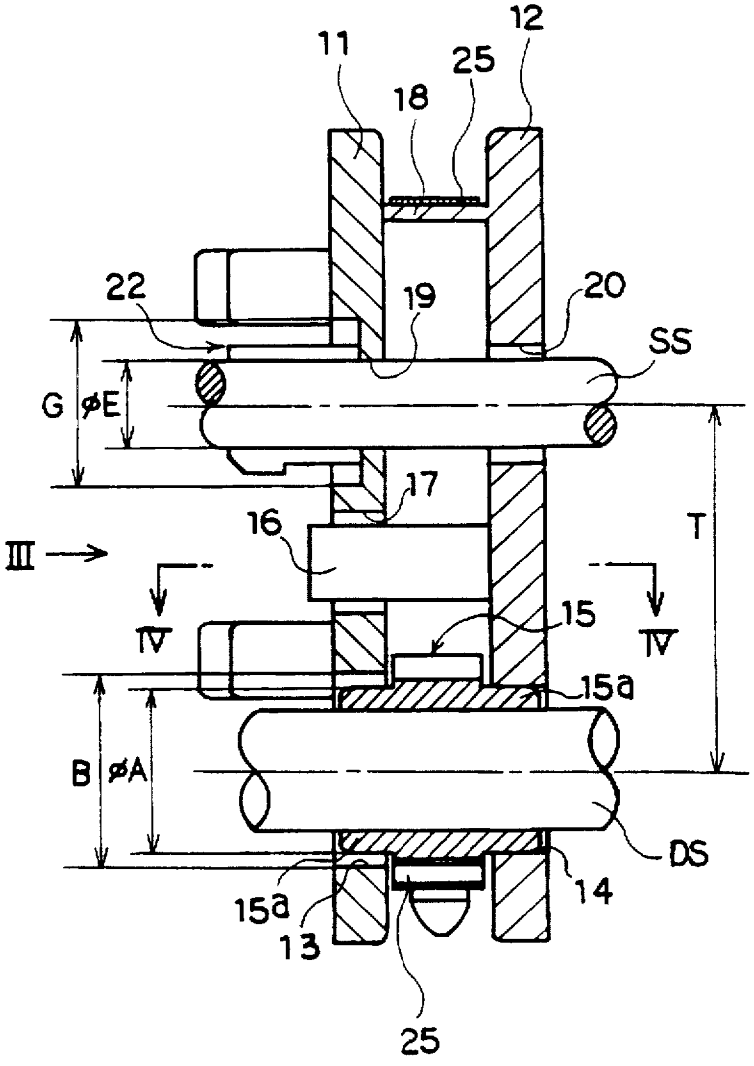
FIG. 2 is a transverse sectional view illustrating the sheet feed tractor shown in FIG. 1.
Figure 11:
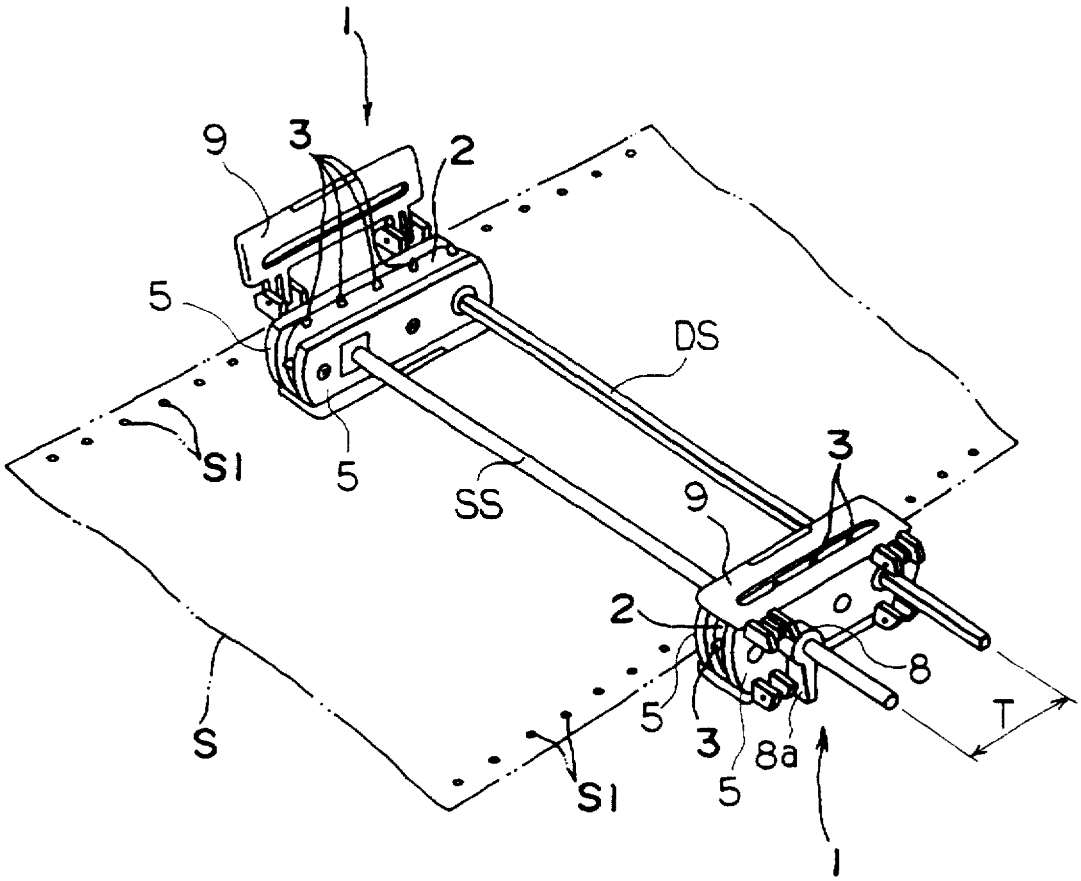
Fig. 11 PRIOR ART
FIG. 11 is an explanatory perspective view illustrating an external appearance of a general sheet feed tractor in a use example.
Figure 12:
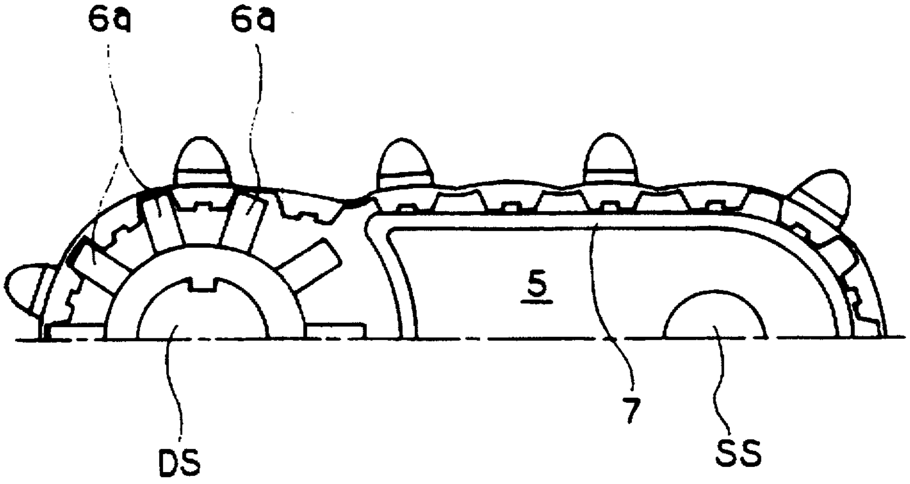
Fig. 12 PRIOR ART
FIG. 12 is an explanatory enlarged side view illustrating a part of a conventional sheet feed tractor.
Figure 13:
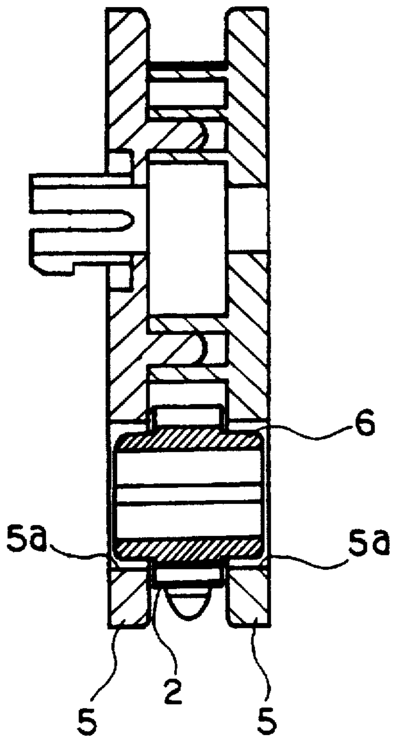
Fig. 13 PRIOR ART
FIG. 13 is an explanatory transverse sectional view illustrating an improved example of the conventional sheet feed tractor.

A sheet feed tractor in an embodiment shown in FIG. 1 has a frame which is composed of a first side frame 11 laid on the outer side of continuous paper (denoted by reference numeral S shown in FIG. 11) and a second side frame 12 laid on the center side of the continuous paper, these side frames 11, 12 being fixed in a face-to-face relation by means of a pin fitting mechanism so as to be replaceable relative to each other.

The side surface shapes of both side frames 11, 12 are substantially rectangular, and drive bearing bores 13, 14 are formed in longitudinal one end side parts both frames (on the downstream side in a paper feed direction) extending therealong, respectively. These drive bearing bores 13, 14 are located at positions facing each other on their common axis, and are rotatably fitted therein with boss parts 15*a*, 15*a* which are formed at axially opposite end parts of a sprocket body of a drive sprocket 15.

Thus, the drive sprocket 15 is rotatably journalled in the drive bearing bores 13, 14 in the first and second side frames 11, 12 which are fixed in a face-to-face relationship. In this arrangement, slight gaps are defined between the opposite side end faces of the sprocket body of the drive sprocket 15 and the opposite inner surfaces of the side frames 11, 12. A substantially square shape polygonal hole 15*b* is formed in the drive sprocket 15, extending through the latter, around the rotating axis, and a drive shaft DS coupled to a drive motor in a printer drive device which is not shown is fitted in the polygonal hole 15*b*.

Meshing teeth 15*c* are formed on the outer peripheral surface of the drive sprocket 15 at pitches in predetermined pattern, and are meshed with meshing teeth 25*a* which are formed on the inner peripheral surface of a transferring belt 25 in the same pattern.

Thus, the transferring belt 25 is wound so as to be meshed with the meshing teeth 15*c* of the drive sprocket 15, and a pair of linear extension parts and a curved extension part of the transferring belt 25, which extend rearward from the drive sprocket 15 are slidably guided by a belt guide 18 integrally incorporated with the second side frame 11, with no slack. The belt guide 18 will be detailed later.

Meanwhile, several feed pins 25*b*, as protrusions, adapted to be engaged in feed holes (which are denoted by reference numeral S1 shown in FIG. 11) formed in the continuous paper (denoted by reference numeral S shown in FIG. 11), at predetermined pitches on the over peripheral surface of the transferring belt 25. When the transfer belt 25 is advanced through the rotation of the drive sprocket 15, the feed pins 25*b* which are present in the linear extension part of the transferring belt 25 are engaged in the feed holes S1 of the continuous paper S which is therefore fed.

Further, as shown in FIGS. 2 to 10, the drive bearing bore 14 formed in the second side frame 12 has a substantially true-circular shape extending therethrough, and accordingly, by this substantially true-circular shape bore 14, the drive sprocket 15 is held to the second side frame 12 with no positional deviation. Meanwhile, the drive bearing bore 13 formed in the first side frame 11 has an elongated oval hole shape extending through the first side frame 11 and having a major diameter extending in the longitudinal direction of the first side frame 11. This drive bearing bore 13 allows variation in the inter shaft distance T between the drive shaft DS and a positioning shaft SS (refer to FIG. 11).

In more specifically, a relationship such as $B>A+2C$ is established, where A is the diameter of the boss part 15*a* of the drive sprocket 15, C is a minimum clearance in the drive bearing bore 13 which is required for rotation of the drive sprocket 15, and B is the major diameter of the drive bearing bore 13. Further, the major diameter B of the drive bearing bore 13 is set as $B \geqq D+A+2C$ where D is a maximum variation in the inter shaft distance T between the drive shaft DS and the positioning shaft SS.

Further, a bifurcated support pin 16 is planted on the second side frame 12 in a longitudinally middle part thereof, being integrally incorporated with the latter, the pin 16 being projected toward the first side frame 11. A pin fitting hole 17 for engaging the support pin 16 is formed in the first side frame 11, extending though the latter. The bifurcated support pin 16 has a pair of projecting pieces 16*a*, 16*ab* which are tandem arranged in the widthwise direction of the side frame (a direction perpendicular to the surface of FIG. 2). Engaging step parts 16*b*, 16*b* are formed in the tip end parts of the projecting pieces 16*a*, 16*a*, respectively, overhanging toward the outer edge of the side frame in the widthwise direction of the side frame.

Figure 3:
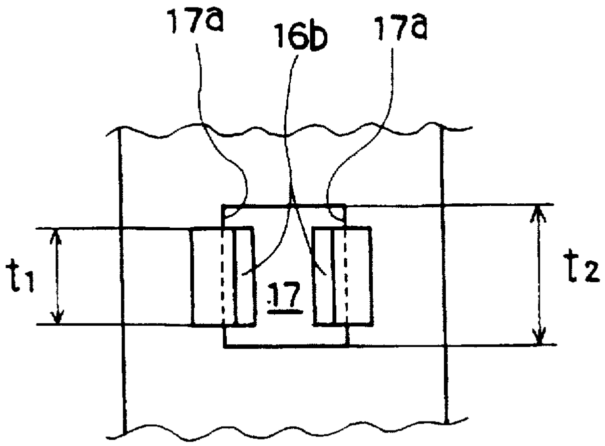
FIG. 3 is an explanatory side view illustrating a part of the feed device shown in FIG. 2 along the arrow line III in FIG. 1.

At this time, as shown in FIG. 3, the above-mentioned projecting pieces 16*a*, 16*a* have a predetermined width t1 in the longitudinal direction of the side frame (the vertical direction in FIG. 3), and the engaging step parts 16*b*, 16*b* also have the same width t1.

Figure 4:
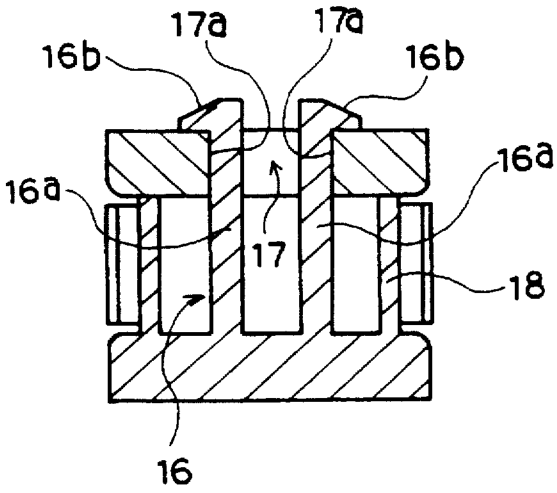
FIG. 4 is a cross-sectional view illustrating a part of the sheet feed tractor shown in FIG. 2, along line IV—IV in FIG. 1.
Figure 5:
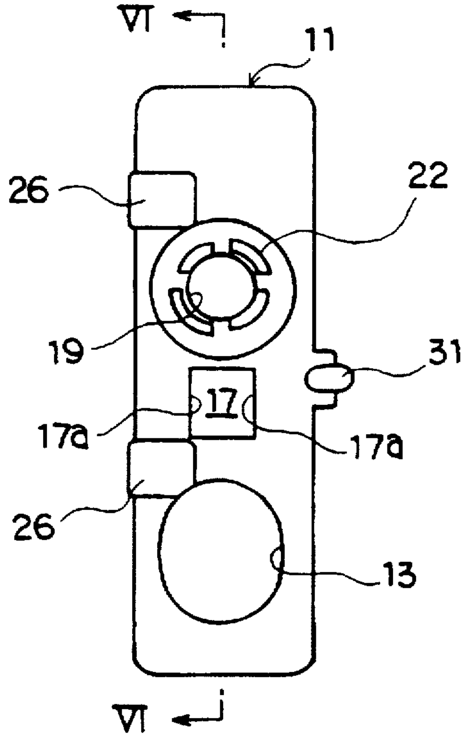
FIG. 5 is an explanatory side view illustrating a first side frame shown in FIG. 1.
Figure 6:
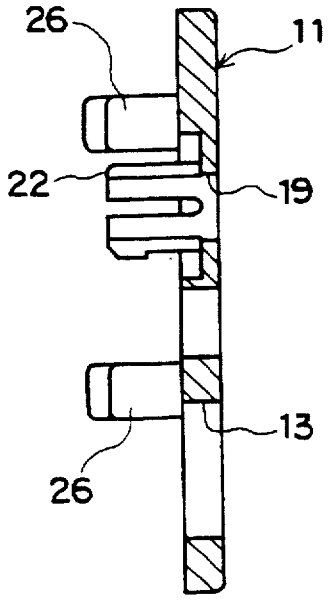
FIG. 6 is an explanatory transverse sectional view along line VI—VI in FIG. 5.
Figure 7:
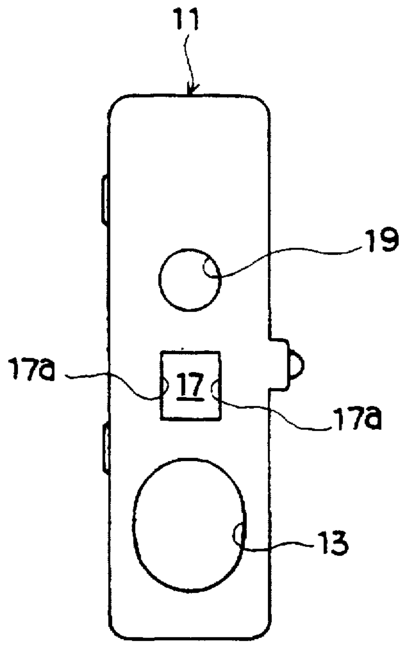
FIG. 7 is an explanatory rear view illustrating the first side frame shown in FIG. 1.
Figure 8:
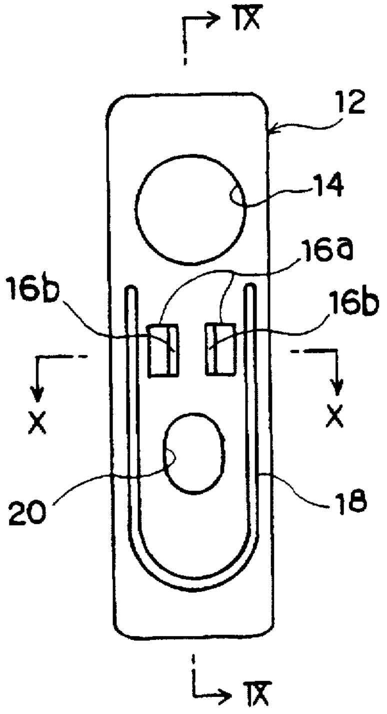
FIG. 8 is an explanatory side view illustrating a second side frame shown in FIG. 1.
Figure 9:
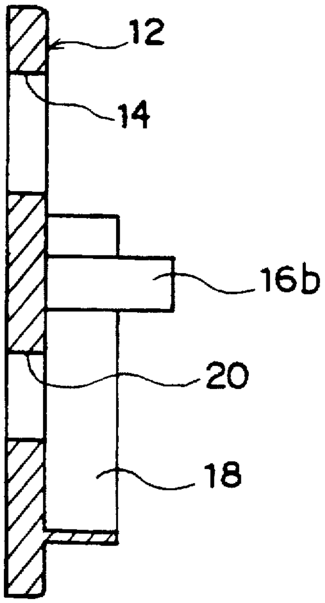
FIG. 9 is an explanatory transverse sectional view along line IX—IX in FIG. 8.
Figure 10:
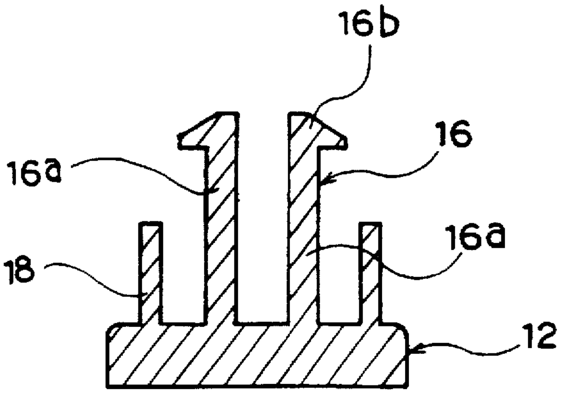
FIG. 10 is a cross-sectional view along line X—X in FIG. 8.

Meanwhile, a pin fitting hole 17 in the first side frame 11 is formed in a substantially rectangular shape, extending through the side frame 11, and of four sides of the pin fitting hole 17, a pair of engaging sides 17*a*, 17*a* which face each other in the widthwise direction of the side frame, are engaged with the engaging steps parts 16*b*, 16*b* of the above-mentioned support pin 16 as mentioned above, being made into press-contact therewith on the outside of the side frame (on the upper side of FIG. 4). At this time, as particularly shown in FIG. 3, the engaging sides 17*a*, 17*a* of the above-mentioned pin fitting hole 17 has a width t2 which is set so as to be more or less larger than the width t1 of the engaging steps part 16*b* of the support pin 16, both side frames 11, 12 are positionally shifted from each other in the longitudinal direction thereof by a difference (t1−t2) therebetween.

At this time, the longitudinal shift value (t1−t2) between both side frames 11, 12 is set to be equal to or slightly larger than the maximum variation D in the inter shaft distance T between the drive shaft DS and the positioning shaft SS (that is, (t1−t2)≧D).

Thus, both side frames 11, 12 are held in a face-to-face relationship by the support pins 16, the space between both side frames 11, 12 are limited by the height of the belt guide 18 integrally incorporated with the second side frame 12. That is, the second side frame 12 is formed thereto with the band-like belt guide 18 having a height slightly larger than the width of the transferring belt 25 and projected toward the first side frame 11.

The belt guide 18 has a U-like shape as viewed in a side view, which is opened toward the drive bearing bore 14 for holding the drive sprocket 15 mentioned above, extending in the longitudinal direction of the second side frame 12 along the inner periphery of the transferring belt 25, so as to support and guide the inner surface of the transferring belt 25. The belt guide 18 has an end edge part projecting toward the first side frame 11, which is made to abut against the inner surface of the first side frame 11 so that both side frames 11, 12 are held with a space therebetween corresponding to the projecting height of the belt guide 18, and the transferring belt 25 is movably arranged spanning the space between both frames 11, 12.

Thus, the belt guide 18, which extends in the longitudinal direction of the frames next to the transferring belt 25, has a pair of linear extension parts and a curved extension part of the transferring belt 25, respectively, so as to be arranged in a guiding structure.

Further, the first and second side frames 11, 12 are formed therein positioning bearing holes 19, 20 spaced from the drive bearing bores 13, 14 by a predetermined distance in the longitudinal direction of the side frames, facing each other, and extending through the side frames. The positioning shaft SS is fitted in these positioning bearing bores 19, 20.

The positioning bearing bore 19 formed in the first side frame 11 has a substantially true-circular shape extending through the side frame 11 so that the positioning shaft SS is fitted with no positional deviation, and the bore diameter of the positioning bearing bore 19 is set to have a minimum clearance for the positioning shaft SS so as to allow the first side frame 11 to slide in the axial direction of the positioning shaft SS.

Meanwhile, the positioning bearing bore 20 formed in the second side frame 12 has an elongated oval shape extending through the second side frame 12 and having a major diameter extending in the longitudinal direction of the side frame so as to allow variation in the inter shaft distance T between the drive shaft DS and the positioning shaft SS. That is, a relationship G>E+2F is established, where E is the diameter of the positioning shaft SS, F is the minimum clearance of the positioning bearing bore 20, by which the second side frame can be slid in the axial direction of the positioning shaft SS, and G is the major diameter of the positioning bearing bore 19. Further, G≧D+E+2F is set where D is the maximum variation in the inter shaft distance T between the drive shaft DS and the positioning shaft SS.

Further, the outside (left side of FIG. 1) opening edge part of the positioning bearing bore 19 formed in the first side frame 11, is integrally incorporated with a clamping cylinder 22 projecting outward (leftward of FIG. 1). The clamping cylinder 22 constitutes a lock mechanism which is fitted therein with the positioning shaft SS fixed to a drive control device in the printer which is not shown. The positioning shaft SS extends outward, passing through the positioning bearing bores 19, 20 in both side frames 11, 12.

The above-mentioned clamping cylinder 22 is formed of an assembly of four resilient cantilever members 22*a* which define therebetween slits. Further, a lock lever 23 is fitted on the outer peripheral part of the clamping cylinder 22. The lock lever 23 has a boss part formed therein with a lock hole 23*a* in which the clamping cylinder 22 is fitted, and a manipulating handle 23*b* having a predetermined length is integrally incorporated with the outer peripheral part of the boss part, extending radially.

The lock hole 23*a* is alternately formed therein with arcuate inner peripheral parts in which the assembly of the four cantilever members 22*a* of the clamping cylinder 22 is loosely fitted, and planar inner peripheral parts for pressing the assembly of the four cantilever members 22*a* of the clamping cylinder 22 toward the center thereof. Accordingly, when the boss part is turned by the manipulating handle 23*b*, the positioning shaft SS in the clamping cylinder 22 is set into either a slidable free condition or a restrained condition. In the restrained condition, the positioning and the fixing of the device body as a whole can be made.

Further, the first side frame 11 formed at its upper edge part as viewed in the figure, with a pair of hinge bearing parts 26, 26 having a predetermined space in the longitudinal direction of the first side frame 11 (paper feeding direction) and projecting therefrom, and a paper retaining plate 27 is formed with a pair of hinge fulcrums 27*a*, 27*a*, corresponding to the hinge bearing parts 26, 26. These hinge fulcrums 27*a*, 27*a* are rotatably fitted in the hinge bearing parts 26, 26, and accordingly, the paper retaining plate 27 is rotatably held. In this arrangement, the rotating range of the paper retaining plate 27 is set between a position (closing position) where it makes contact with the outer surface of the continuous paper (refer to reference numeral S shown in FIG. 7) and a position (opening position) where it slightly retract outward from an area directly above the continuous paper.

Further, an upper hook 30 is projected from the paper retaining plate 27 at a position offset from the hinge fulcrum 27*a* by a predetermined distance, and a lower hook 31 is projected from the second side frame 12 in the upper edge part thereof as viewed in the figure. A coil spring 32 is stretched under tension between both hooks 30, 31. The offset of the upper hook 30 is set to be spaced from the hinge fulcrum 27*a* toward the paper by a predetermined distance when the paper retaining plate 27 is closed. That is, a rotational moment exerted to the paper retaining plate 27 in accordance with the offset of the upper hook 30 exhibits an urging force in a direction in which the paper retaining plate 27 is closed. When the paper retaining plate 27 is closed, the continuous paper S is pressed against the transferring belt 25 by the paper retaining plate 27, and accordingly, the paper feed operation can be stably held by this pressing force without the feed pins 25*b* of the transferring belt 25 coming off from the feed holes S1 of the continuous paper S.

Further, the paper retaining plate 27 is formed therein with an elongated hole 27*b* corresponding to the linearly extending part of the transferring belt 25 and extending along the running direction of the transferring belt 25. Further, when the paper retaining plate 27 is closed, the feed pins 25*b* of the transferring belt 25 are received in the elongated hole 27*b*, and accordingly, it is possible to prevent interference between the paper retaining plate 27 and the feed pins 25*b*. It is noted that the paper retaining plate 27 is opened overcoming the urging force of the coil spring 32 when the continuous paper S is removed from the device.

Further, the plate thickness of the paper retaining plate 27 varies in the paper feed direction, that is, it is a largest in the center part thereof but is thinned toward both ends thereof. That is, the sectional shape of the paper retaining plate 27 in the direction orthogonal to the paper feed direction is changed in the paper feed direction in consideration with the distribution of bending moment effected in the paper retaining plate 27. Accordingly, the gap between the paper retaining plate 27 and the continuous paper is held in a predetermined size for a long time.

Thus, in this embodiment, the second side frame 12 can be held with respect to the drive sprocket 15 engaged to the drive shaft DS, with no positional deviation through the substantially true-circular drive bearing bore 14, and the transferring belt 25 is supported under a predetermined tension while a predetermined positional relationship is maintained with the drive sprocket 15 by the belt guide 18 integrally incorporated with the second side frame 12. Further, the first side frame 11 is surely maintained in a predetermined positional relationship with the positioning shaft SS through the positioning bearing bore 19.

Further, if the inter shaft distance T between the drive shaft DS and the positioning shaft SS varies due to any reason, the first and second side frames 11, 12 are positionally shifted relative to each other in the direction of connection between both shafts DS, SS according to the variation in the inter shaft distance T. This positional shift, that is, a variation in the inter shaft distance T between both shafts DS, SS is allowed by clearances of the elongated hole shape positioning bearing bore 20 formed in the second side frame 12 and the elongated hole shape drive bearing bore 13 formed in the first side frame 11.

Meanwhile, even though such a variation in the inter shaft distance T occurs, the transfer belt 25 is stably held while the a predetermined position relationship with the drive sprocket 15 is maintained by the belt guide 18 integrally incorporated with the first side frame 11. Accordingly, the transferring belt 25 can be always held under a preferably predetermined tension with no variation.

Although the present invention made by the present inventor has be en specifically explained in an embodiment form, the present invention should not limited to this embodiment, but can be modified in various ways without departing the scope and the concept of the invention. For example, if the drive bearing bore formed in the side frame integrally incorporated with the belt guide has a substantially true-circular shape, the elongated hole for allowing variation in the inter shaft distance can be located at a suitable position.

Further, although it has been explained in the above-mentioned embodiment that the device is positioned and fixed with the use of the lock mechanisms 22, 23 having the lock levers, with respect to the positioning shaft SS, the device can be fixed at a predetermined position with the use of coupling and fixing mechanisms other than such lock mechanisms.

Further, the lock mechanisms 22, 23 and the paper retaining plate 27 can be attached to either the first side frame 11 or the second side frame 12. Further, It is not necessary to incorporate the clamping cylinder 22 of the lock mechanism, integrally with the associated frame, that is, it can be provided independently. In such a case that the clamping cylinder 22 is independently provided, a predetermined clearance is obtained in the attaching hole of the clamping cylinder, with which variation in the inter shaft distance can be allowed.

Further, the drive bearing bores formed in the both frames may be formed in a substantially true-circular shape extending therethrough while the positioning bearing bore may be formed in an elongated hole shape extending therethrough. In this case, both frames are located at predetermined positions with respect to the drive sprocket engaged to the drive shaft, and further, variation in the inter shaft distance between the drive shaft and the positioning shaft is allowed by clearances formed in the elongated hole shape positioning bearing bores formed in both frames.

Meanwhile, the belt guide in this arrangement can be integrally incorporated with at least one of both frames, and with this belt guide, the transferring belt can be supported while a predetermined positional relationship is maintained with respect the drive sprocket, thereby it is possible to hold the transferring belt always under a predetermined satisfactory tension with no variation in the tension of the transferring belt.

Further, both frames can be fitted so as to be displaceable in the direction of connection between the drive shaft and the positioning shaft, or may be fitted indisplaceably. In such a case that the both frames are fitted so as to be displaceably, variation in the inter shaft distance between the drive shaft and the positioning shaft is allowed by a positional shift between both frames.

What is claimed is:

1. A sheet feed tractor comprising a pair of first and second frames which are arranged in a face-to-face relationship and in substantial parallel with each other;
   - a drive sprocket rotatably held by said pair of first and second frames;
   - a pair of drive side bearing bores formed respectively in said first and second frames, extending therethrough, at positions where they face to each other, for rotatably journalling said drive sprocket;
   - a looped transferring belt wound around spanning the space between the first and second frames so as to mesh with said drive sprocket;
   - a belt guide for slidably supporting the inner surface side of the transferring belt;
   - a drive shaft extending through said pair of drive side bearing bores, for transmitting a rotating drive force to said drive sprocket;
   - a pair of positioning side bearing bores formed respectively in said first and second frames, being spaced from said pair of drive side bearing bores by a predetermined distance and extending therethrough at positions where they face to each other; and a positioning shaft extending through the pair of positioning side bearing bores in substantially parallel with the drive shaft, being spaced by a predetermined distance from the drive shaft, wherein the first and second frames are fitted on both shafts so as to be displaceable in a direction of connection of both shafts, and the drive side bearing bore formed in the second frame is formed therethrough in a substantially true-circular shape so as to hold said drive sprocket to the second frame with no positional deviation, and the positioning bearing bores formed in the second frame and the drive bearing bore formed in the first frame are elongated in the specific direction of diameter through their respective frames so as to allow variation in the inter shaft distance between both shafts, and the belt guide is integrally formed with the second frame.

2. A sheet feed tractor as set forth in claim 1, wherein the positioning side bearing bore formed in the first frame is formed in a substantially true-circular shape, extending therethrough so as to hold said first frame to the positioning shaft with no positional deviation.

3. A sheet feed tractor as set forth in claim 1, wherein said positioning side bearing bore formed in said first frame is formed in an elongated hole shape in the specific direction of diameter, extending therethrough so as to allow variation in the inter shaft distance between said drive shaft and said positioning shaft.

4. A sheet feed tractor as set forth in claim 1, wherein said first and second frames are fitted together so as to be relatively shifted in a direction along a line connecting an axis of said drive shaft and an axis of said positioning shaft.

5. A sheet feed tractor as set forth in claim 1, wherein said first drive side bearing bore of said first frame is formed in elongated diameter compared with said second drive side bearing bore of said second frame.

6. A sheet feed tractor as set forth in claim 1, wherein said drive sprocket is rotatably held in said second drive side bearing bore of said second frame.

7. A sheet feed tractor as set forth in claim 1, wherein said first and second frames are fitted with no relative positional deviation in a direction along the axis of said drive shaft.

8. A sheet feed tractor comprising:

a first frame having a first drive side bearing bore and a first positioning side bearing bore spaced from said first drive side bearing bore;

a second frame arranged facing to and in substantially parallel with said first frame, said second frame having a second drive side bearing bore, a second positioning side bearing bore and an inner surface facing to said first frame, said second drive side bearing bore facing to said first drive side bearing bore, said second positioning side bearing bore being spaced from said second drive side bearing bore and facing to said first positioning side bearing bore;

a drive sprocket rotatably held by said first and second drive side bearing bores between said first and second frames;

a belt guide provided only on said inner surface of said second frame;

a looped transferring belt wound around said belt guide and said drive sprocket between said first and second frames so as to mesh with said drive sprocket;

a drive shaft for transmitting a rotating force to said drive sprocket and fitted in said drive sprocket extending through said first and second drive side bearing bores;

a positioning shaft extending through said first and second positioning side bearing bores and arranged in substantially parallel with said drive shaft; and said second drive side bearing bore formed in said second frame having a substantially true circular shape so as to hold said drive sprocket to said second frame without positional deviation, said first drive side bearing bore formed in said first frame having an elongated hole shape in a direction of its diameter so as to allow variation in a shaft distance between said drive shaft and said positioning shaft.

9. A sheet feed tractor as set forth in claim 8, wherein said first and second frames are fitted together so as to be relatively shifted in a direction along a line connecting an axis of said drive shaft and an axis of said positioning shaft.

10. A sheet feed tractor as set forth in claim, 8 wherein said first drive side bearing bore of said first frame is formed in elongated diameter compared with said second drive side bearing bore of said second frame.

11. A sheet feed tractor as set forth in claim 8, wherein said first positioning bearing bore of said first frame has a substantially true circular shape so as to hold said first frame without positional deviation with respect to said positioning shaft.

12. A sheet feed tractor as set forth in claim 11, wherein said second positioning bearing bore of said second frame is elongated in a specific direction of a diameter so as to allow variation in the shaft distance between said drive shaft and said positioning shaft.

13. A sheet feed tractor as set forth in claim 8, wherein said drive sprocket is rotatably held in said second drive side bearing bore of said second frame.

14. A sheet feed tractor as set forth in claim 8, wherein said first and second frames are fitted with no relative positional deviation in a direction along the axis of said drive shaft.

* * * * *